Nov. 7, 1944.   P. H. JAMES   2,362,135
LEVELING DEVICE FOR GRAVIMETERS
Filed Dec. 19, 1940   2 Sheets-Sheet 2

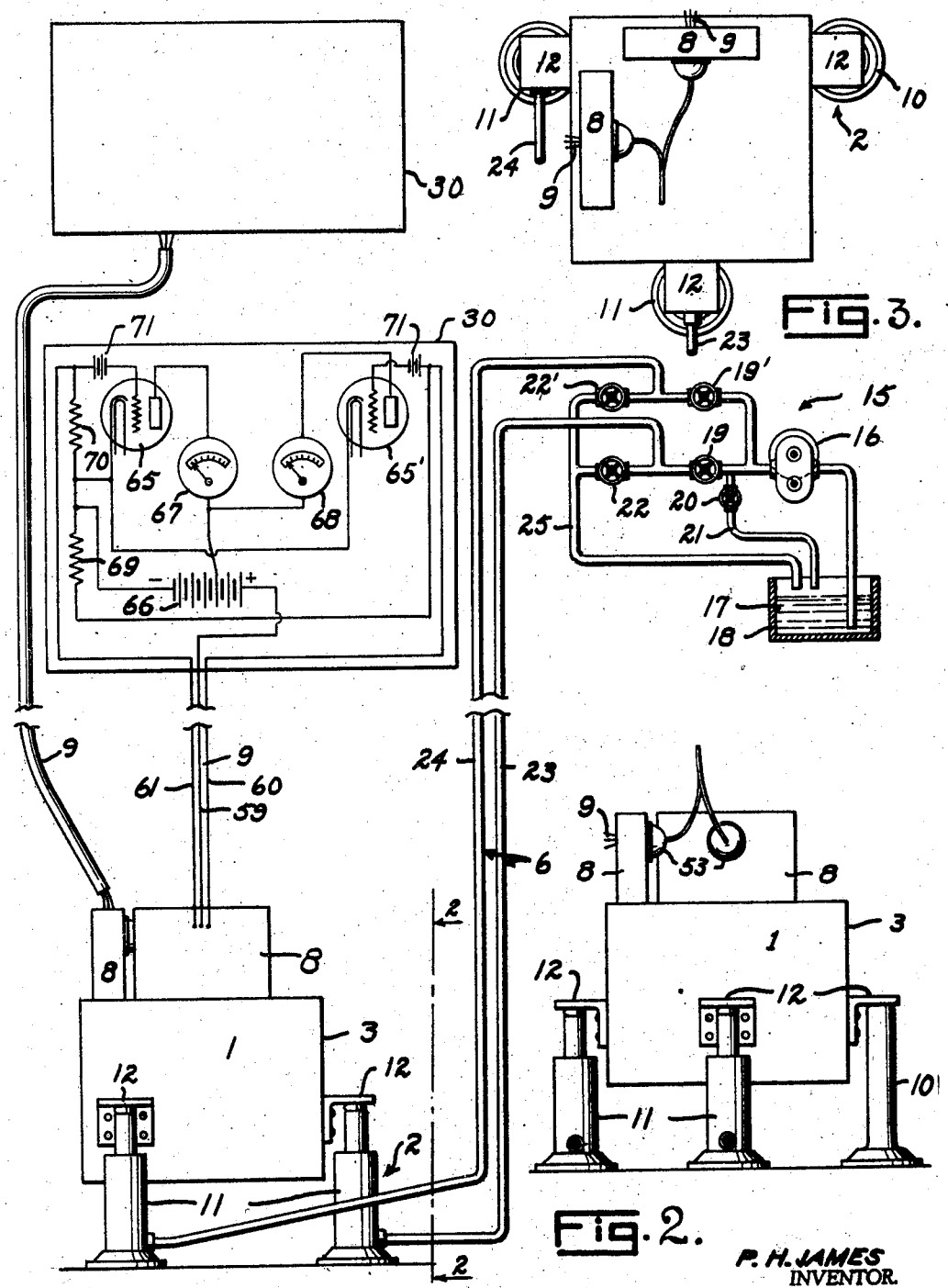

P. H. JAMES
INVENTOR.

BY Lester B. Clark

ATTORNEY.

Patented Nov. 7, 1944

2,362,135

UNITED STATES PATENT OFFICE 2,362,135

LEVELING DEVICE FOR GRAVIMETERS

Patrick H. James, Houston, Tex., assignor to Robert H. Ray Inc., Houston, Tex., a corporation of Texas Application December 19, 1940, Serial No. 370,804

5 Claims. (Cl. 73—382)

This invention relates to leveling apparatus and more particularly to instrumentalities for effecting leveling of a device at a point remote from such device. The invention is of particular utility in the art of gravimetric prospecting for leveling a gravity measuring instrument which has been lowered to the submerged surface in a water covered area and by means of which instrument measurements are to be made to determine the variations in the force of gravity as indicative of the nature of subsurface geological structures.

While the invention may be, and is to be understood as, of general utility yet it is of a special utility in connection with gravimetric prospecting in water covered areas and the following description is directed primarily to a construction which is utilizable for such purpose. The illustrative embodiment of the invention accordingly proposes a construction comprising an encased gravimeter which may be lowered to and positioned upon a submerged surface, means being provided to level the gravimeter within its encasement so that an observation of the force of gravitational attraction at that point may be made.

In order that the leveling operation may be carried out from the surface of the submerging medium a plurality of adjustable supports are interposed between the gravimeter and its incasement and remote control mechanism, operable at the surface of the submerging medium as from a boat used as the base of operations, is provided. Indicating mechanism is also provided to indicate at the control point when the desired condition of levelness is obtained.

The primary object of the invention is to provide a system of the class described whereby a device may be moved to a level position with facility and accuracy by level indicating and control mechanisms operated at a point remote from the device.

Another object is to provide an incased measuring instrument which may be lowered upon a submerged surface, means controllable from the surface of the submerging medium being provided for moving the instrument to a level position preliminary to making observations with the instrument.

Still another object is to provide a gravity measuring system including a gravimeter mounted upon adjustable supports which are operatively connected to mechanisms at an operation station for leveling the instrument by the adjustment of such supports.

Another object is to provide means at the operating station for indicating the condition of levelness of the gravimeter.

A further object is to provide a gravimeter leveling device including a novel indicating mechanism which accurately indicates tilting of the instrument from a level position and the direction of such tilting.

A still further object is to provide a novel tilt indicator which includes a tiltable assembly and light sensitive elements operable by the movements of the assembly to indicate a level condition and, when tilting takes place, to indicate the direction of such tilting.

The foregoing are primary objects which will be more fully apparent, together with other objects, by reference to the following description taken in connection with the accompanying drawings in which:

Fig. 1 is a schematic view showing a gravimetric measuring system embodying the invention;

Fig. 2 is a side elevational view of the gravimeter assembly taken on line 2—2 in Fig. 1;

Fig. 3 is a plan view of the assembly shown in Fig. 2;

Figure 6:
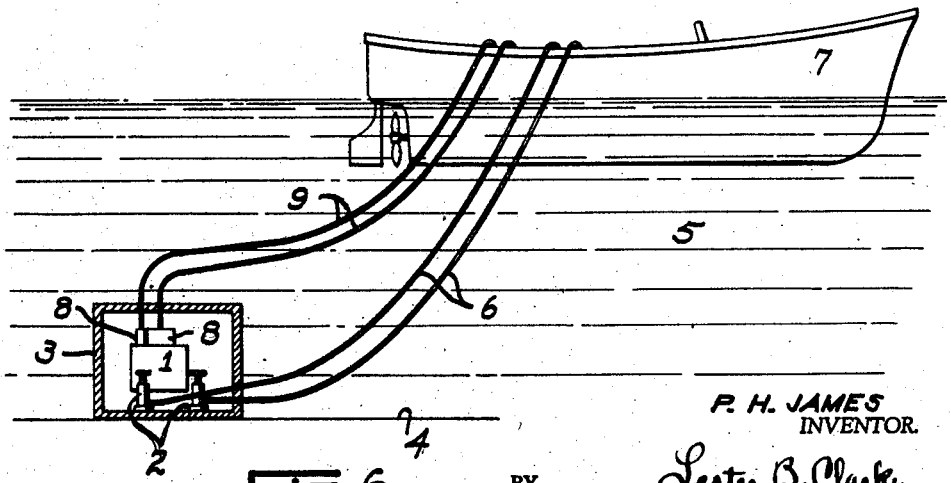
Fig. 6 is a schematic view showing the apparatus of the invention in use for making gravimetric measurements at the submerged surface in a water covered area.

Referring first to Fig. 6 of the drawings, the invention is shown as comprising a gravimeter 1 mounted upon supports 2 within a housing 3 which is positioned upon the surface 4 submerged by the body of water 5. As will more fully appear some of the supports 2, as illustrated are hydraulic jacks which are connected by means of flexible conduits 6 to pressure fluid control equipment within the boat 7 whereby pressure fluid may be admitted to or withdrawn from the jacks to move the instrument 1 to a level position so that observations may be made thereby. Associated with the gravimeter 1 are tilt responsive devices 8 which are connected by means of conductors 9 to an indicating instrument in the boat 7 so that the operator at the operating station therein is apprised of the operations necessary to accurately level the gravimeter 1 while the gravimeter assembly is in position upon the surface 4.

It is to be understood that the surface 4 will be variously contoured and the present invention is designed to enable the operator in the boat 7 to quickly move the gravimeter to a level position regardless of the contour of the surface 4 and to maintain such position with a high degree of accuracy.

Any suitable means and method may be utilized for obtaining a reading with the gravimeter 1 when the instrument has been leveled by the means of the instrumentalities, just generally described, such instrumentalities being no part of the present invention. I prefer, however, to perform such function in the manner illustrated in my copending application Serial No. 370,805, filed December 19, 1940, to which reference may be had.

Referring to Figs. 1 to 3 inclusive it is to be noted that the supports heretofore referred to as 2 comprise a fixed support 10 and the two hydraulic jacks 11 whereby the gravimeter 1 is supported at three points upon the bottom of the incasing housing 3. These supports engage ears 12 attached to the housing 3 and it seems apparent that adjustment of the jacks 11 will cause tilting movement of the housing 3 relative to the fixed support 10 and that therefore proper adjustment of the jacks will move the gravimeter to a horizontal or level position so that readings may be obtained thereby.

The jacks 11 are controlled from an operating station generally designated as 15 at which station there is provided a pump 16 which withdraws fluid from the supply 17 in the container 18. Such fluid may be admitted to the respective jacks 11 by manipulation of the valves 19 and 19' so that the pump fluid will be forced through the conduits 23 and 24 to the jacks. If, however, such valves are closed and the pump 16 remains in continuous operation, the pumped fluid will flow by way of the relief valve 20 and return conduit 21 to the container 18. By means of the construction thus far described the elevation of the jacks 11 may be accurately controlled and in this manner the instrument 1 may be moved to a level position provided the ears 12 engaging the jacks 11 are in planes below the upper end of the support 10.

If it is necessary to lower the jacks 11 in order to level the instrument 1, return valves 22 and 22' may be desirably controlled so that fluid will be forced from the jacks through the conduits 23 and 24 under the influence of the weight of the gravimeter assembly 1. The fluid thus released from the jacks 11 returns by way of conduit 25 to the interior of the container 18.

In order to ascertain the functioning produced in the manner just described the tilting units 8 are associated with the gravimeter 1 and are shown as mounted upon the gravimeter housing. Each of these units is so positioned as to be responsive to tilting in a plane determined by the support 10 and one of the jacks 11. Each of the units is connected by means of the conductor cable 9 to an indicating instrument 30 which is located at the operating station within the boat 7.

Figure 4:
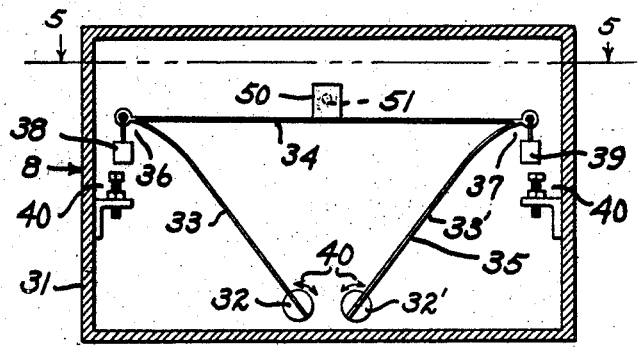
Fig. 4 is a front elevation showing the interior of one of the indicator mechanisms, the view being taken on line 4—4 in Fig. 5.
Figure 5:
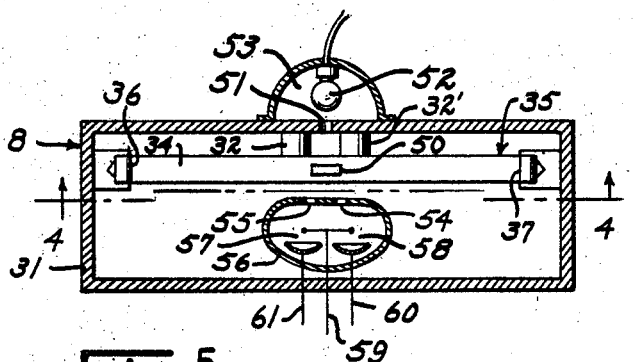
Fig. 5 is a plan view taken on line 5—5 in Fig. 4.

The units 8 are identical and attention is now directed to the illustrated embodiment which is shown in detail in Figs. 4 and 5. The housing 31 of the unit 8 is provided with rotatably adjustable supporting posts 32 and 32' which are secured to the housing in such manner that their axes lie in a plane parallel with the bottom of the housing. The inner ends of these posts are slotted to receive the ends of resilient leaf members 33 and 33' which extend divergingly upward in the housing and are secured at their upper ends to a transverse member 34 to form a triangular-shaped tiltable assembly generally referred to as 35. This assembly is loaded at the junctions 36 and 37 of the members 33 and 33' respectively with the member 34 by means of masses 38 and 39. The amount of tilting of the assembly that can take place is limited by means of adjustable stops 40 mounted beneath the respective masses 38 and 39.

This triangular tiltable assembly 35 is placed under stress by means of rotational adjustment of the supporting posts 32 and 32' as indicated by the arrows. Such stress is coordinated with the dimensions of the assembly and the size of the masses 38 and 39 so that very slight tilting of the housing 31 from the horizontal will cause a large departure of the assembly from its mean position. The assembly 35 thus operates as an inverted pendulum and by virtue of the characteristic operation thereof as just explained it is possible to level the gravimeter with a high degree of accuracy and the use of two or more of the units enables precise leveling operations to be carried out by desirably adjusting the jacks 11.

The transverse member 34 of the assembly 35 has an opaque shield 50 mounted thereon so that, when the assembly 35 is in its mean position, such shield is positioned directly forwardly of an opening 51 in the rear of the housing 31. This opening is in alignment with a light source 52 mounted in a chamber 53 at the rear of the housing 31, such source of light being energized from any desirable source of energy (not shown). The shield 50 is of such width that any movement of the assembly 35 from its mean position will permit light from the source 52 to pass about one edge of the shield and enter one or the other of the spaced openings 54 or 55 in the casing 56 which surrounds a pair of light sensitive elements 57 and 58. These light sensitive elements have a common terminal and spaced terminals which respectively are attached to conductors 59, 60 and 61. These conductors extend through the cable 9 to the instrument 30 in the boat 7.

The instrument 30 comprises thermionic tubes 65 and 65' and a B-battery 66 which is connected to the plates of the tubes 65 and 65' through meters 67 and 68 respectively. Any suitable meter may be used such as milliammeters which indicate the amount of current flowing in the plate circuit of the respective tubes. The conductor 59 is connected to the positive terminal of the battery 66 and the negative terminal of the battery is connected through resistors 69 and 70 to the conductors 60 and 61 so that a potential is maintained between the terminals of the light sensitive elements 57 and 58 whereby a current will tend to flow through a circuit including one of such elements whenever a beam of light is caused to fall upon that element.

The conductors 60 and 61 are also connected through C-batteries 71 to the grids of the respective tubes 65 and 65'. It seems apparent that when current flows through either of the circuits including resistor 69 or 70 in response to the beam of light falling upon the light sensitive element 57 or 58 current will flow in the plate circuit of one of the tubes 65 or 65'. This current will be indicated by the meter 67 or the meter 68 and such flow of current indicates the direction in which the shield 50 has moved to admit light to one of the light sensitive elements.

When the tiltable assembly 35 is brought to a mean position no light will pass through the openings 54 or 55 and hence the meters 67 and 68 will read zero, or a predetermined equal value depending upon the constants of the circuit, the width of the shield 50, the intensity of the light 52, etc.

In the use of the system above described the valves 19 and 22 will be manipulated in such manner that one of the instruments 30 will indicate a condition of levelness in one plane. The valves 19' and 22' will then be adjusted in such manner that the other instrument 30 will indicate a condition of levelness in a plane at right angles to the initial adjustment. There is such coordination of movement of the jacks 11 that the meters 67 and 68 in each of the instruments 30 will indicate when the gravimeter 1 is level and such instruments will also indicate whenever the gravimeter has departed from a level condition and the direction in which such departure has taken place.

The foregoing description has been directed to a preferred embodiment of the invention and the manner of using the apparatus of the invention. It is intended that the invention shall not be confined to the specifically disclosed construction since the invention broadly comprehends the provision of a level system which is of particular utility in leveling a gravity measuring instrument placed upon a submerged surface, such leveling device being controlled at a point remote from the instrument being leveled.

What is claimed is:

1. In an apparatus of the class described the combination of, a device to be leveled, hydraulically operable means controlled from a remote position for moving said device to a level position, means for indicating the level position of the device and inclination from such position, said last mentioned means comprising a housing, an inverted pendulum mounted in said housing to tilt when the housing is moved from a level position, and indicating means operable to indicate when the instrument is level and to indicate the direction of tilt when the instrument is tilted.

2. In an apparatus of the class described, a device to be leveled, a pair of horizontally spaced supports secured to said device, and a framework comprising a pair of tensioned leaf members extending upwardly from said supports and interconnected at their upper ends whereby the inverted pendulum so formed is adapted to move sidewardly upon tilting of the device to indicate a departure of the device from a level position.

3. Apparatus for making geophysical measurements at the submerged surface in water covered areas comprising the combination of, a container adapted to be located at the submerged surface, a geophysical instrument adjustably supported in said container, means including at least one hydraulic jack, operable to move the instrument relative to the container, a liquid conduit extending from said jack to the surface of the submerging medium, hydraulic control means connected to said conduit at said surface including liquid control means for controlling the flow of liquid to and from said first mentioned means, level responsive means mounted in fixed relation to said geophysical instrument, and means proximate said liquid control means for indicating when said instrument has been moved within the container to a level position.

4. Apparatus for making geophysical measurements at the submerged surface in water covered areas comprising the combination of, a container adapted to be located at the submerged surface, a geophysical instrument adjustably supported in said container, means comprising a pair of hydraulic jacks operable to move the instrument in angularly spaced planes, liquid conduits extending from said jacks to the surface of the submerging medium, hydraulic control means connected to said conduits at the surface of the submerging medium for controlling the flow of liquid to and from each of said respective jacks, level responsive means mounted in fixed relation to said geophysical instrument, and means proximate said liquid control means for indicating when said instrument has been moved within the container to a level position.

5. In an apparatus of the class described the combination of, a device to be leveled, hydraulically operable means controlled from a remote position for moving said device to a level position, means for indicating the level position of the device and inclination from such position, said last mentioned means comprising a housing, an inverted pendulum mounted in said housing to tilt when the housing is moved from a level position, indicating means operable to indicate when the instrument is level and to indicate the direction of tilt when the instrument is tilted, said last mentioned means including a light source, a pair of light responsive elements, and means carried by said pendulum for controlling the light intensity admitted to said elements respectively in accordance with movement of the pendulum from a mean position when the device is level.

PATRICK H. JAMES.